(12) United States Patent
Zhang et al.

(10) Patent No.: US 11,246,075 B2
(45) Date of Patent: Feb. 8, 2022

(54) APPARATUS, SYSTEM AND METHOD FOR DUAL CONNECTIVITY

(71) Applicant: NEC CORPORATION, Tokyo (JP)

(72) Inventors: Xiaowei Zhang, Tokyo (JP); Anand Raghawa Prasad, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/354,273

(22) Filed: Mar. 15, 2019

(65) Prior Publication Data

US 2019/0215748 A1 Jul. 11, 2019

Related U.S. Application Data

(63) Continuation of application No. 15/123,494, filed on Sep. 2, 2016, now Pat. No. 10,375,614.

(Continued)

(30) Foreign Application Priority Data

Mar. 6, 2014 (JP) ................................ 2014-043929

(51) Int. Cl.
*H04W 36/28* (2009.01)
*H04W 76/27* (2018.01)
(Continued)

(52) U.S. Cl.
CPC ......... *H04W 36/28* (2013.01); *H04W 12/041* (2021.01); *H04W 12/0433* (2021.01);
(Continued)

(58) Field of Classification Search
CPC . H04W 76/15; H04W 36/0069; H04W 12/04; H04W 12/0401; H04W 16/32
See application file for complete search history.

(56) References Cited

U.S. PATENT DOCUMENTS 9,930,016 B2   3/2018 Ryoo et al.
2014/0241317 A1 * 8/2014 Jamadagni ............ H04W 40/36
                                                370/331
(Continued)

FOREIGN PATENT DOCUMENTS

CN        102892114 A    1/2013
KR   10-2013-0054911 A   5/2013

OTHER PUBLICATIONS

Ericsson, "SCE Discussions in SA3#74", pp. 1-2, 3GPP TSG SA WG3 (Security) Meeting #74, Taipei, Taiwan, S3-140211, Jan. 20-24, 2014 (Year: 2014).*

(Continued)

*Primary Examiner* — Nam T Huynh
(74) *Attorney, Agent, or Firm* — Sughrue Mion, PLLC

(57) ABSTRACT

An SeNB (30) informs an MeNB (20) that it can configure bearers for the given UE (10). At this time, the MeNB (20) manages the DRB status, and then sends a key S-KeNB to the SeNB (30). The MeNB (20) also sends a KSI for the S-KeNB to both of the UE (10) and the SeNB (30). After this procedure, the MeNB (20) informs an EPC (MME (40) and S-GW (50)) about the new bearer configured at the SeNB (30), such that the S-GW 50 can start offloading the bearer(s) to the SeNB 30. Prior to the offloading, the EPC network entity (MME (40) or S-GW (50)) performs verification that: 1) whether the request is coming from authenticated source (MeNB); and 2) whether the SeNB (30) is a valid eNB to which the traffic can be offload.

4 Claims, 6 Drawing Sheets

Related U.S. Application Data

(60) Provisional application No. PCT/JP2015/001164, filed on Mar. 5, 2015.

(51) Int. Cl.

| | | |
|---|---|---|
| *H04W 12/041* | (2021.01) | |
| *H04W 12/0433* | (2021.01) | |
| *H04W 28/08* | (2009.01) | |
| *H04W 36/00* | (2009.01) | |
| *H04W 12/122* | (2021.01) | |
| *H04W 88/08* | (2009.01) | |
| *H04W 92/20* | (2009.01) | |

(52) U.S. Cl.
CPC ........... *H04W 28/08* (2013.01); *H04W 76/27* (2018.02); *H04W 12/122* (2021.01); *H04W 36/0069* (2018.08); *H04W 88/08* (2013.01); *H04W 92/20* (2013.01)

(56) References Cited

U.S. PATENT DOCUMENTS

| | | | |
|---|---|---|---|
| 2015/0148038 A1 | 5/2015 | Griot et al. | |
| 2015/0208235 A1* | 7/2015 | Ingale .................. | H04W 12/04 455/411 |
| 2015/0351139 A1* | 12/2015 | Zhang ..................... | H04J 3/00 370/329 |
| 2016/0029213 A1 | 1/2016 | Rajadurai et al. | |
| 2016/0338130 A1* | 11/2016 | Park ..................... | H04W 76/15 |

OTHER PUBLICATIONS

Ericsson, "SeNB release procedures", 3GPP TSG-RAN WG2 #85, Tdoc R2-140648, Feb. 10-14, 2014, pp. 1-6 (total 6 pages).
Communication dated Jan. 20, 2020 from European Patent Office in EP Application No. 15 712 436.3.
Huawei, Hisilicon et al., "Corrections for presence reporting area based location reporting",SA WG2 Meeting #101, S2-140458, Jan. 20-24, 2014, Taipei, Taiwan, pp. 1-27 (27 pages total).
Communication dated Jun. 25, 2019, from the Japanese Patent Office in the counterpart Application No. 2018-165147.
Communication dated Jun. 26, 2019, from the United States Patent and Trademark Office in U.S. Appl. No. 16/413,643.
"Response to SP-130720: Reply LS on Small Cell Enhancement work in RAN", SA3, Jan. 20-24, 2014, pp. 1-2, 3GPP TSG SA WG3 (Security) Meeting #74, Taipei, Taiwan, S3-140210.
Written Opinion for PCT/JP2015/001164 dated Jun. 9, 2015.
Communication dated Jul. 18, 2017 from the Korean Intellectual Property Office in counterpart application No. 10-2016-7027649.
Ericsson, "Stage 2 Documentation of Agreements reached during the Study Item Phase," 3GPP TSG-RAN WG3 Meeting #83; R3-140342; Prague, Czech Republic, Feb. 10-14, 2014 (8 pages total).
Ericsson, "SCE Discussions in SA3#74", pp. 1-2, 3GPP TSG SA WG3 (Security) Meeting #74, Taipei, Taiwan, S3-140211, Jan. 20-24, 2014.
ETRI, "Considerations on Network Architecture for Dual Connectivity," 3GPP TSG-RAN WG2 #81 bis, R2-131185, Chicago, USA, Apr. 2013. (4 pages total).
Ericsson, "Dual connectivity algorithm negotiation," 3GPP TSG SA WG3 (Security) Meeting #74; S3-140118; Jan. 20-24, 2014; Taipei, Taiwan; (3 pages total).
3rd Generation Partnership Project; Technical Specification 3GPP TR 36.842 V1.0.0, "Group Radio Access Network; Evolved Universal Terrestrial Radio Access (E-UTRA); Study on Small Cell Enhancements for E-UTRA and T-UTRAN-Higher layer aspects" (Release 12), Nov. 2013 (68 pages total).
"Reply LS on security aspects of protocol architectures for small cell enhancements", SA3, Jan. 20-24, 2014, pp. 1-2, 3GPP TSG SA WG3 (Security) Meeting #74, Taipei, Taiwan, S3-140209.
International Search Report for PCT/JP2015/001164 dated Jun. 9, 2015.
Ericsson, "Signalling Procedures for Dual Connectivity," 3GPP TSG-RAN WG2 #84, Tdoc R2-134219, San Francisco, USA, Nov. 2013. (9 pages total).
Communication dated Oct. 25, 2016 from the Japanese Patent Office in counterpart application No. 2016-535196.
Decision for Grant of Patent dated Oct. 27, 2017 issued by the Korean Intellectual Property Office in counterpart application No. 10-2016-7027649.
3rd Generation Partnership Project, "Technical Specification Group Radio Access Network; Study on Small Cell enhancements for E-UTRA and E-UTRAN; Higher layer aspects (Release 12)", 3GPP TR 36.842, vol. 12.0.0, Dec. 2012, pp. 1-71, Sophia Antipolis, Valbonne, France.
"SeNB change and inter-MeNB handover procedure", NSN, Nokia Corporation, Feb. 10-14, 2014, pp. 1-8, 3GPP TSG-RAN WG3 Meeting #83, Prague, Czech Republic, R3-140424.
NEC Corporation, "Security Freshness Counter Value," 3GPP TSG RAN2 Meeting #85, R2-140581, Prague, Czech Republic, Feb. 2014. (4 pages total).
Samsung, "Discussion on Security Solution for 1A SCE UP Architecture," 3GPP TSG SA WG3 (Security) Meeting #74; S3-140125; Jan. 20-24, 2014; Taipei (Taiwan); 5 pages total.
Communication dated Feb. 6, 2018 issued by the Japanese Patent Office in counterpart application No. 2017-022334.
Final Office Action dated Sep. 22, 2020 from USPTO in U.S. Appl. No. 16/413,643.

* cited by examiner

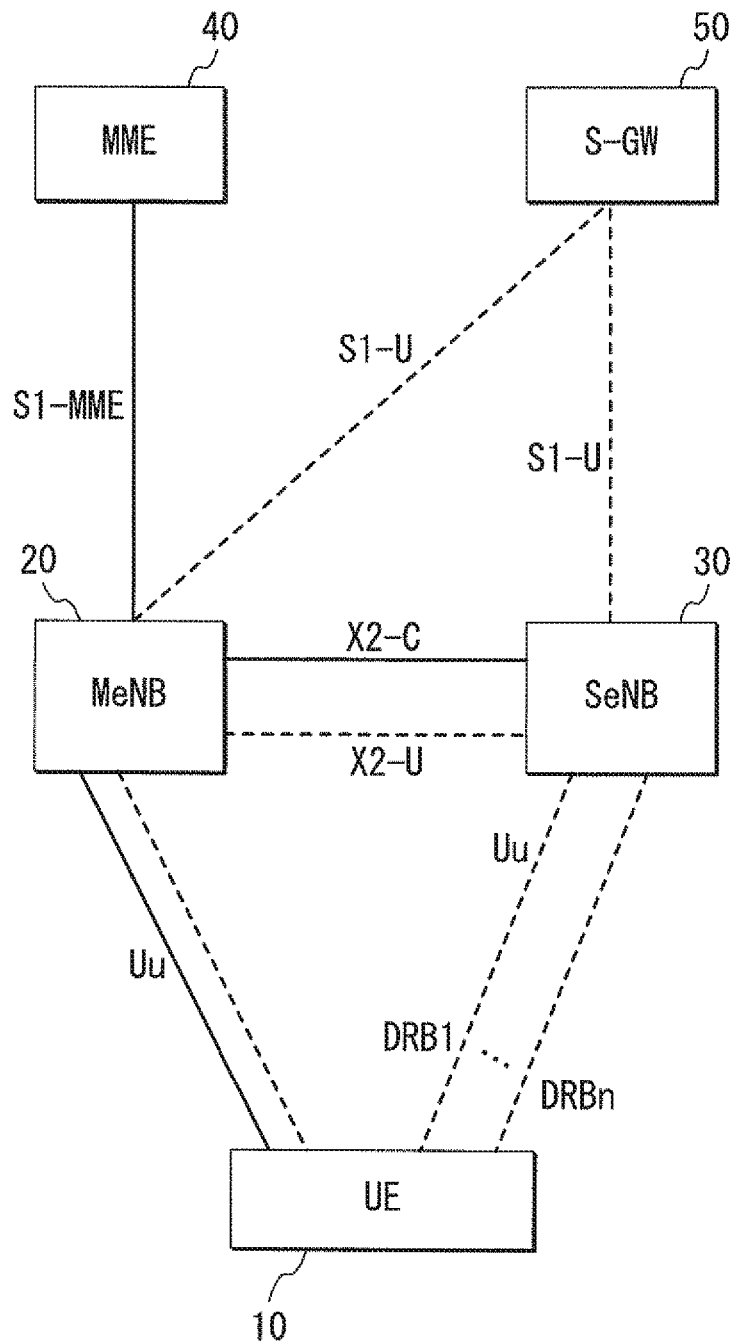
[Fig. 1]

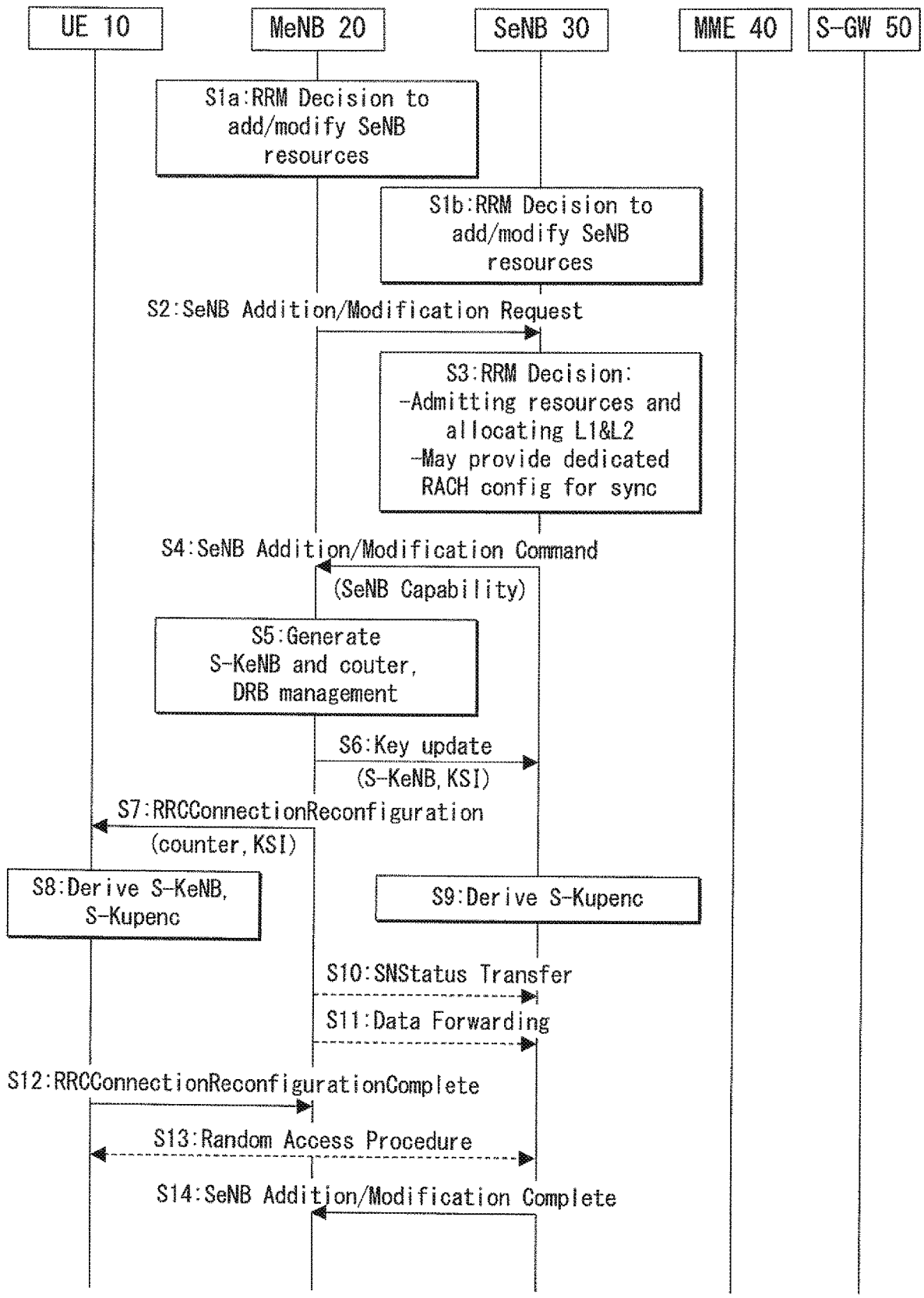
[Fig. 2]

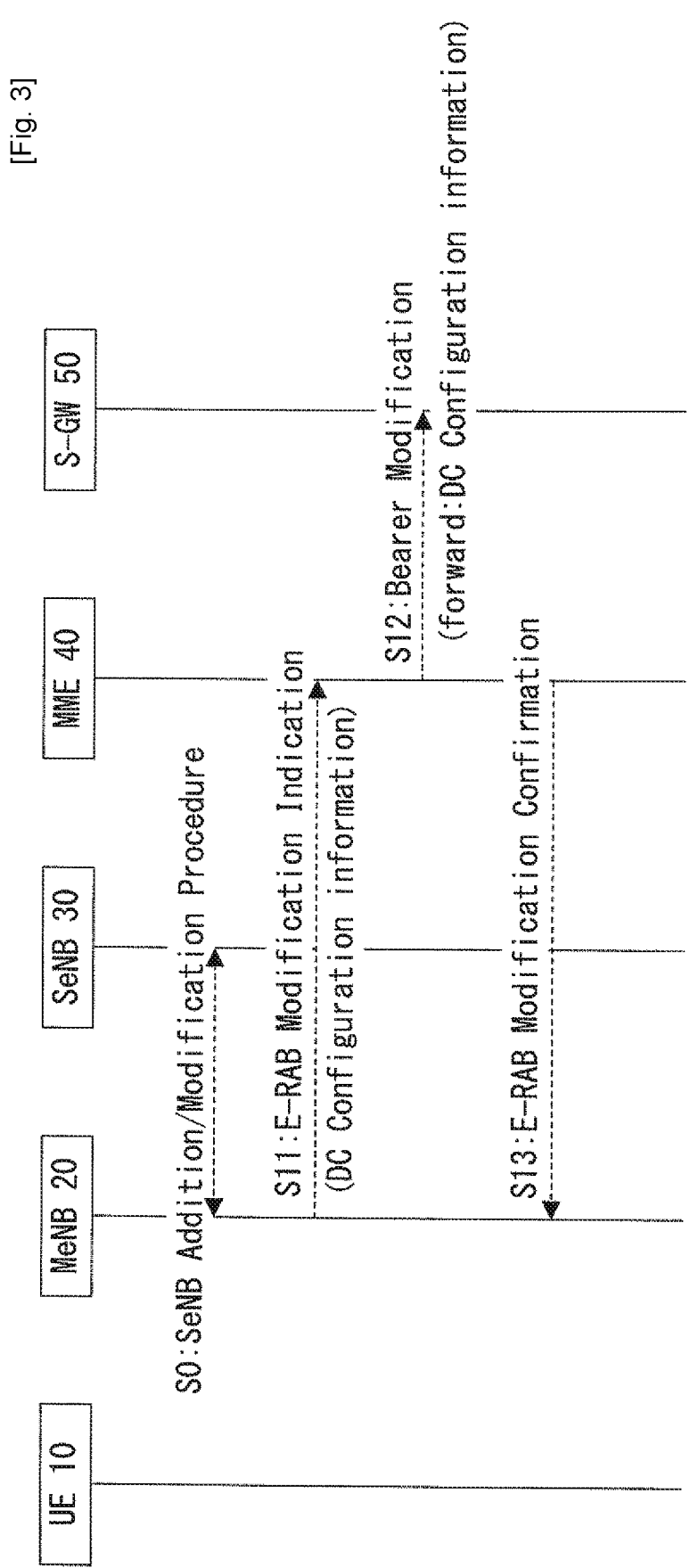
[Fig. 3]

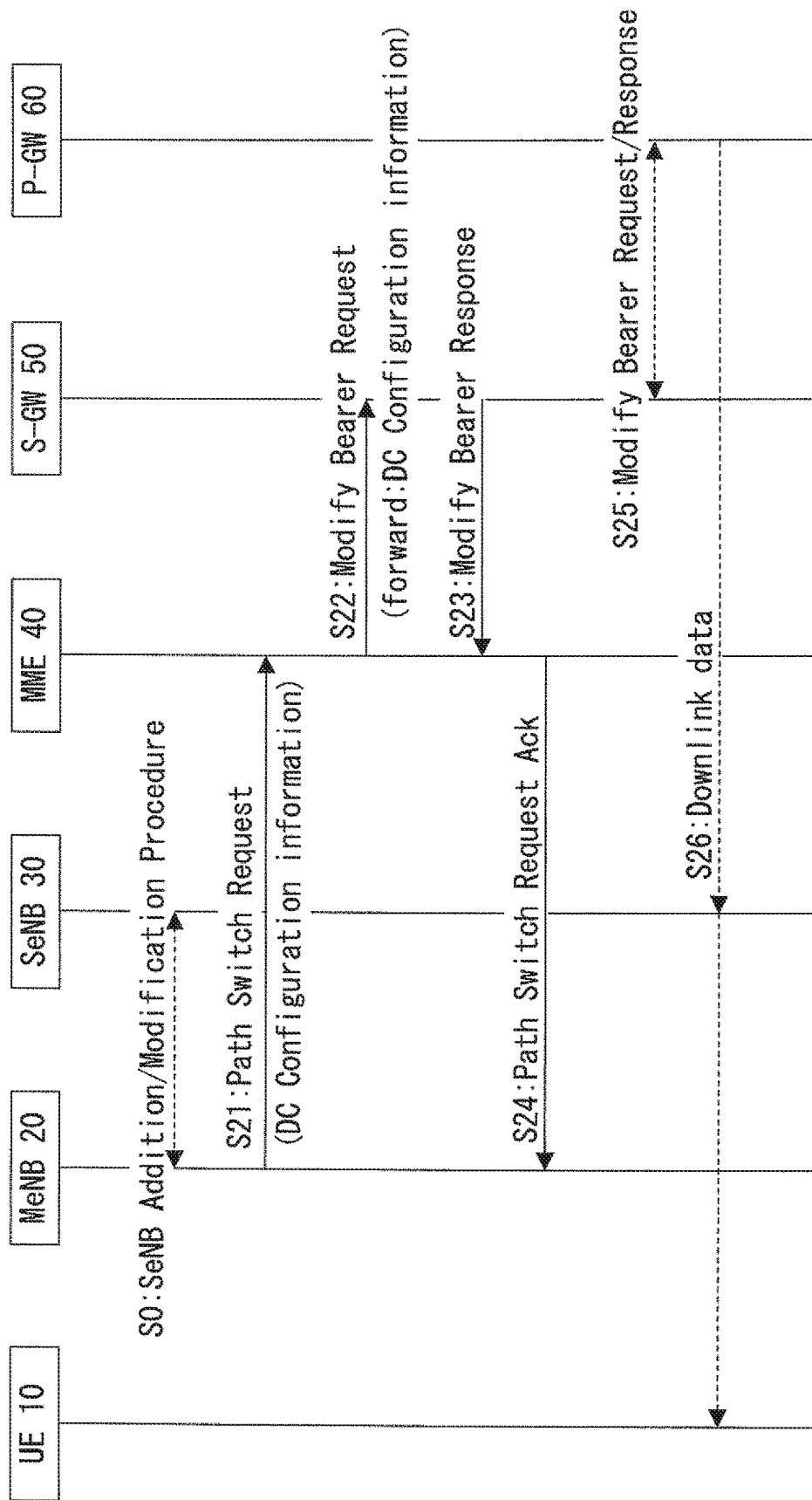
[Fig. 4]

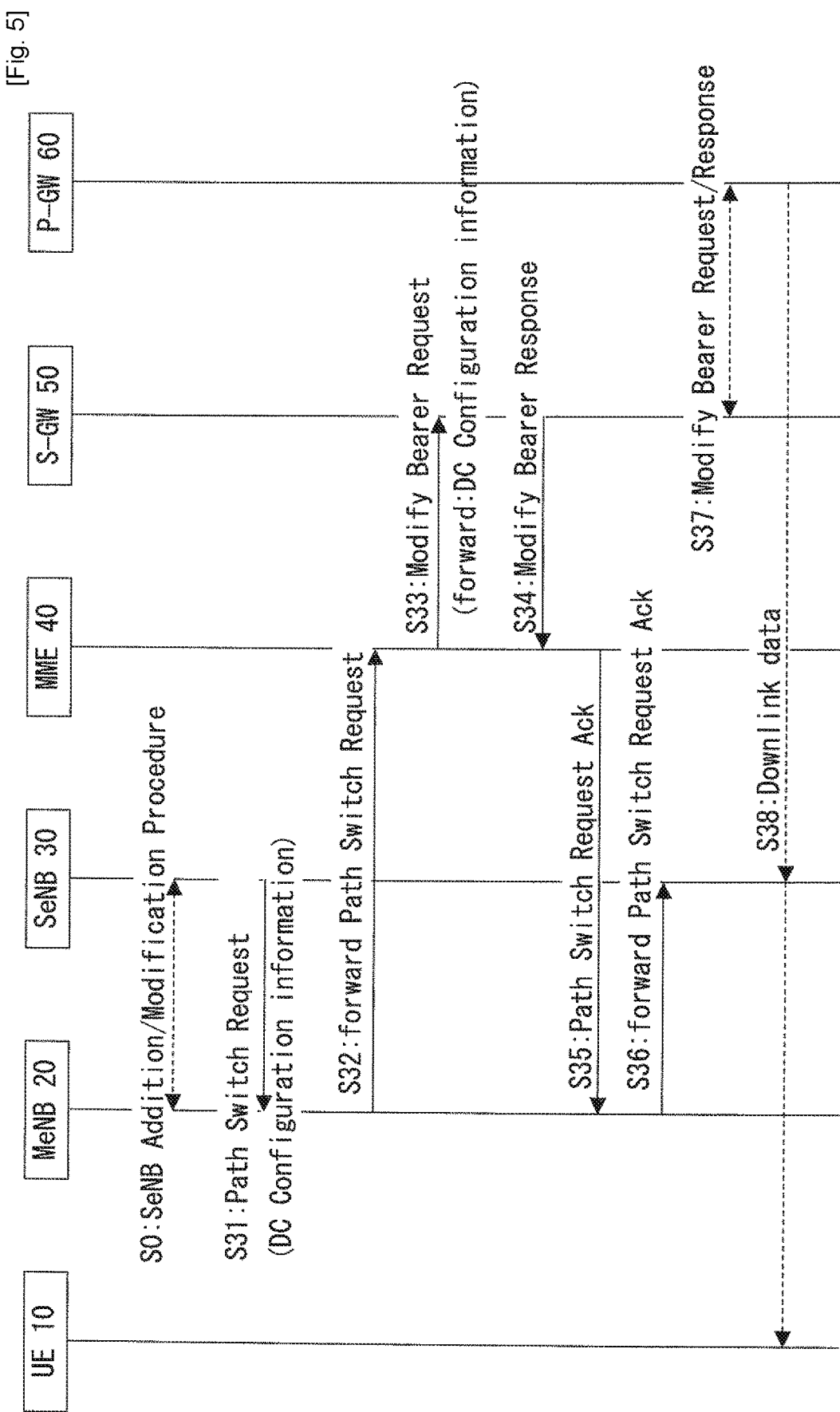

[Fig. 6]
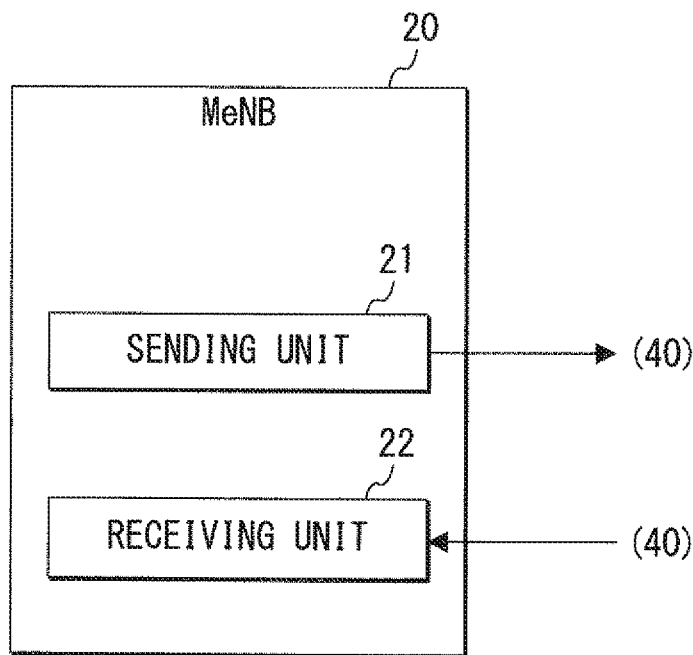
[Fig. 7]
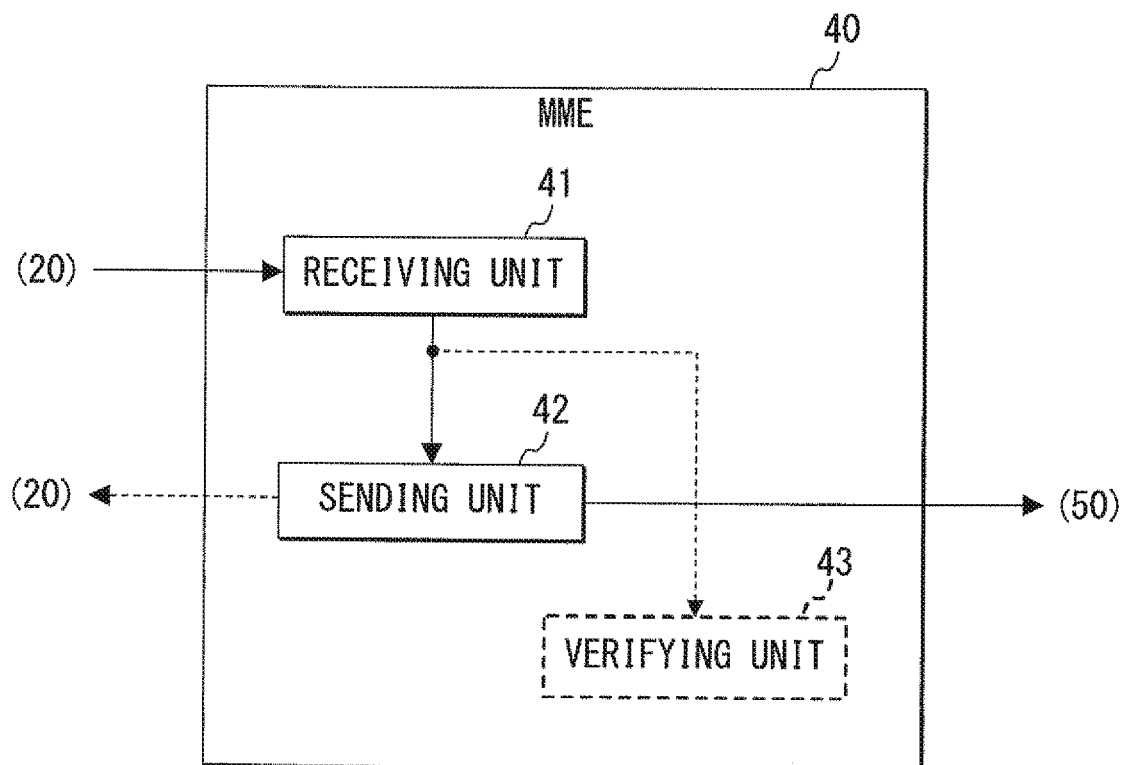

APPARATUS, SYSTEM AND METHOD FOR DUAL CONNECTIVITY

CROSS-REFERENCE TO RELATED APPLICATIONS

This application is a continuation of U.S. patent application Ser. No. 15/123,494, filed Sep. 2, 2016, which is a 371 of PCT/JP2015/001164, filed Mar. 5, 2015, which claims benefit of priority to Japanese Patent Application No. 2014-043929, filed Mar. 6, 2014. The entire disclosures of the prior applications are considered part of the disclosure of the accompanying continuation application, and are hereby incorporated by reference.

TECHNICAL FIELD

The present invention relates to an apparatus, a system and a method for DC (Dual Connectivity) or SCE (Small Cell Enhancement), and particularly to a technique to secure SeNB (Secondary eNB (evolved Node B)) Addition/Modification procedure in order to provide security in dual connectivity for the given UE (User Equipment).

BACKGROUND ART

The SCE or DC was defined in 3GPP (3rd Generation Partnership Project) RAN (Radio Access Network) working groups, and it has initiated a study on security aspect and impact on the architecture 1A defined in NPL 1.

For user plane data transmission between UE and SeNB, a new key for the confidentiality protection is needed. The RRC (Radio Resource Control) signaling terminates in the MeNB (Master eNB), thus it is responsible for the key management.

In current architecture disclosed in NPL 1, each UE is connected to one MeNB and one SeNB. There can be multiple bearers between SeNB and UE. The key for UE and SeNB user plane communication protection, denoted as S-KUPenc, is derived at SeNB and UE from a key S-KeNB shared between UE and SeNB. The S-KeNB is derived at MeNB and sent to SeNB. UE derives the same S-KeNB at its side.

CITATION LIST

Non Patent Literature

NPL 1: 3GPP TR 36.842, "Study on Small Cell enhancements for E-UTRA and E-UTRAN; Higher layer aspects (Release 12)", V12.0.0, 2013-12
NPL 2: S3-140211, 3GPP TSG SA WG3 (Security) Meeting #74
NPL 3: S3-140209, 3GPP TSG SA WG3 (Security) Meeting #74
NPL 4: S3-140210, 3GPP TSG SA WG3 (Security) Meeting #74

SUMMARY OF INVENTION

Technical Problem

However, the inventors of this application have found that in the current solution, there are the following problems a) to c).

a) The key S-KeNB is sent in SeNB "Addition/Modification Request" as disclosed in NPLs 2 to 4. That is, the key S-KeNB is sent before SeNB is configured. Consider when a SeNB rejects the configuration (due to its capability or some other reason), or the configuration fails, the MeNB has to derive a new S-KeNB for the next SeNB it attempts to configure, meanwhile increases the counter.

b) There is no information of SeNB DRB (Data Radio Bearer) configuration at MeNB. This may cause improper key derivation and management, i.e., whether a new key S-KeNB should be derived when a new DRB is configured in SeNB.

c) S-KeNB identity: SeNB may serve more than one UEs, and UE may connect to more than one SeNBs at different times or at same time (potential future architecture), giving a KSI (Key Set Identifier) can ensure UE and SeNB identify the key.

Accordingly, an exemplary object of the present invention is to provide a solution for solving at least one of the above-mentioned problems.

Solution to Problem

In order to achieve the above-mentioned object, each of an apparatus, a system and a method according to exemplary aspects of the present invention gives more details on:

1) Optimized SeNB Addition/Modification procedure based on security: key derivation and allocation; and
2) Secure SeNB Addition/Modification.

According to first exemplary aspect of the present invention, there is provided a mobile communication system for dual connectivity. This mobile communication system includes: a first Node B; a second Node B; a mobility management apparatus; and a gateway. The first Node B sends a Modification Indication message including information on dual connectivity or information on the second Node B to the mobility management apparatus. The mobility management apparatus sends a Modify Bearer Request message including the information on dual connectivity or the information on the second Node B to the gateway.

According to second exemplary aspect of the present invention, there is provided a communication method for dual connectivity having a first Node B and a second Node B. This communication method includes: sending a Modification Indication message including information on dual connectivity or information on the second Node B from the first Node B to a mobility management apparatus; and sending a Modify Bearer Request message including the information on dual connectivity or the information on the second Node B from the mobility management apparatus to a gateway.

According to third exemplary aspect of the present invention, there is provided a base station used in dual connectivity. This base station includes: sending means for sending a Modification Indication message including information on dual connectivity or information on a second base station for dual connectivity to a mobility management apparatus; and receiving means for receiving a Modification Confirmation message from the mobility management apparatus.

According to fourth exemplary aspect of the present invention, there is provided a mobility management apparatus used in dual connectivity. This mobility management apparatus includes: receiving means for receiving a Modification Indication message including information on dual connectivity or information on a second Node B from a first Node B; and sending means for sending a Modify Bearer Request message including the information on dual connectivity or the information on the second Node B to a gateway.

Advantageous Effects of Invention

According to the present invention, it is possible to solve at least one of the above-mentioned problems.

BRIEF DESCRIPTION OF DRAWINGS

FIG. 1 is a block diagram showing a configuration example of a system according to an exemplary embodiment of the present invention.

FIG. 2 is a sequence diagram showing an example of optimized SeNB Addition/Modification procedure in the system according to the exemplary embodiment.

FIG. 3 is a sequence diagram showing a first example of bearer modification and SeNB verification at S-GW in the system according to the exemplary embodiment.

FIG. 4 is a sequence diagram showing a second example of bearer modification and SeNB verification at S-GW in the system according to the exemplary embodiment.

FIG. 5 is a sequence diagram showing a third example of bearer modification and SeNB verification at S-GW in the system according to the exemplary embodiment.

FIG. 6 is a block diagram showing a configuration example of an MeNB according to the exemplary embodiment.

FIG. 7 is a block diagram showing a configuration example of an MME according to the exemplary embodiment.

DESCRIPTION OF EMBODIMENTS

Hereinafter, an exemplary embodiment of an apparatus, a system and a method according to the present invention, will be described with the accompanying drawings.

FIG. 1 shows a configuration example of a system according to this exemplary embodiment, taking as an example the architecture where there is one SeNB per UE.

This system includes a UE 10, an MeNB 20, an SeNB 30, an MME (Mobility Management Entity) 40, and an S-GW (Serving Gateway) 50. Note that although the illustration is omitted in FIG. 1, the system also includes a P-GW (PDN (Public Data Network) Gateway) 60 as shown in FIGS. 4 to 6.

As shown by solid lines in FIG. 1, there are provided several interfaces for C-Plane (Control-Plane) signaling. The UE 10 communicates with the MeNB 20 through a Uu interface. The MeNB 20 communicates with the SeNB 30 through an X2-C interface, and communicates with the MME 40 through an S1-MME interface. The S1-MME interface does not exist between the SeNB 30 and the MME 40.

Further, as shown by dotted lines in FIG. 1, there are also provided several interfaces for U-Plane (User-Plane) communication. Each of the MeNB 20 and the SeNB 30 communicates with the S-GW 50 through an S1-U interface. In this architecture, U-Plane traffic between the UE 10 and the S-GW 50 is transmitted through the MeNB 20 and the SeNB 30 in parallel for the purpose of offloading the MeNB 20 (in other words, for the purpose of offloading the backhaul S1-U interface between the MeNB 20 and the S-GW 50). Moreover, one or more bearers DRB1 to DRBn are established between the UE 10 and the SeNB 30.

Next, there will be described operation examples of this exemplary embodiment with reference to FIGS. 2 to 5.

1. Optimized SeNB Addition/Modification Procedure

To counter the problems a) to c) given above, this exemplary embodiment proposes that:

S-KeNB is sent after step S4 "SeNB Addition/Modification Command" shown in FIG. 2. At step S4, the SeNB 30 informs that it can configure bearers for the given UE 10.

The MeNB 20 manages the DRB status.

The MeNB 20 sends KSI to both of the UE 10 and the SeNB 30.

FIG. 2 is based on the scenario disclosed in NPL 1 that there is only one MeNB and SeNB per UE. Note that processes at step S4, S6 and S7 are novel part in this invention.

New step/parameter in key derivation and allocation are as follows.

Step S4: The SeNB 30 sends to the MeNB 20 its capabilities, if it is different from standard. The capabilities of the SeNB 30 are included in SeNB Addition/Modification Command.

Step S6: The MeNB 20 sends the S-KeNB and KSI after receiving the SeNB Addition/Modification Command. A new message for sending the S-KeNB and the KSI can be defined as Key Update.

The reason for performing this step is: reduce the counter value usage. If the MeNB 20 sends the S-KeNB in the SeNB Addition/Modification Request at step S2, and the SeNB 30 does not have radio resource for the UE 10, the MeNB 20 will have to derive a new key and send to next SeNB till it finds the capable SeNB.

Step S7: the MeNB 20 sends a KSI of S-KeNB to the UE 10 with the counter. This is to make sure that the UE 10 will use the same key as the SeNB 30.

2. Authorization of MeNB and SeNB

After the SeNB Addition/Modification procedure, the "update of the UP path towards the EPC is performed" as described in NPL 1. The MeNB 20 should inform the MME 40 and the S-GW 50 about the new bearer configured at the SeNB 30, such that the S-GW 50 can start offloading the bearer(s) to the SeNB 30.

Before doing the offloading, the network entity (MME 40 or S-GW 50) should perform verification that: 1) whether the request is coming from authenticated source (MeNB); and 2) whether SeNB is a valid eNB to which the traffic can be offload. The network entity (MME 40 or S-GW 50) can be pre-configured with information for the verification, or it can interact with another entity requesting for verification.

In order to offload the traffic to the correct SeNB 30, the S-GW 50 needs to know that there is offload bearer configured in the SeNB 30 and traffic from the SeNB 30 to the UE 10, on top of SeNB ID (identity) & IP (Internet Protocol) address. Therefore, the SeNB 30 or the MeNB 20 should indicate the DC configuration information (contains the configured DRB information, SeNB ID and SeNB IP address) to the S-GW 50, such that the S-GW 50 knows that dual connectivity is being activated and a new bearer is added to the SeNB 30, and the S-GW 50 should not release the bearer in the MeNB 20. The MME 40 should also be informed that dual connectivity is being activated, such that it can behave accordingly including forwarding the S-GW 50 the information and should not behave same as in handover procedure when Path Switch Request message is received from the MeNB 20.

FIGS. 3 to 5 show alternatives 1 to 3 for the bearer modification and SeNB verification at the S-GW 50, respectively.

Alternative 1

This alternative follows the current procedure in NPL 1, FigureG. G.1-1, Steps 11-13. The changes are given below:

At step S11 shown in FIG. 3, the MeNB 20 informs the MME 40 about newly configured SeNB and DRB, includes 1) DC configuration information (contains the configured DRB information, SeNB ID and SeNB IP address), and 2) indicator to show this is for DC. The MME 40 can forward the S-GW 50 the information in Step S12.

Step S12: The MME 40 sends bearer modification to the S-GW 50 indicating that this is a DC case together with information that the given DRB of a UE should be sent to the SeNB 30.

The network entity (MME 40 or S-GW 50) verifies: 1) whether the MeNB 20 is allowed to configure the SeNB 30 for the given UE 10; 2) whether the SeNB 30 is a valid network element; and 3) whether the SeNB 30 is authorized to provide dual connectivity. When the verification is done at the MME 40, it should be after the MME 40 receives Step S11 message. When the verification is done at the S-GW 50, it can happen after it receives the message from the MME 40.

Alternative 2

The procedure uses Path Switch procedure as indicated in G1 of NPL 1.

Note that it is initiated by the MeNB 20.

At step S21 shown in FIG. 4, the MeNB 20 sends Path Switch Request message to the MME 40, includes 1) DC configuration information (contains the configured DRB information, SeNB ID and SeNB IP address), and 2) indicator to show this is for DC. This is to inform that there is a new bearer from a SeNB has been configured not that UE has changed cell in handover procedure.

Step S22: When the MME 40 receives Path Switch Request, it determines whether this message is for DC or handover. If it is for DC, it will not compute NH (Next Hop) and not increase the NCC (Next-hop Chaining Counter) value it keeps. The MME 40 then sends Modify Bearer Request message to the S-GW 50, includes the DC configuration information (contains the configured DRB information, SeNB ID and SeNB IP address) it received above.

Step S23: The S-GW 50 sends Modify Bearer Response to the MME 40, if the verification is successfully completed.

Step S24: The MME 40 sends Path Switch Request Ack (Acknowledgement) to the MeNB 20. The MME 40 should include an indicator to inform the MeNB 20 this is for DC. The MME 40 should not include any NCC value in this message since this is not for handover.

Step S25: The S-GW 50 and the P-GW 60 exchange the Modify Bearer Request/Response messages.

Step S26: The P-GW 60 starts Downlink data.

The network entity (MME 40 or S-GW 50) should perform the verification as in Alternative 1.

Alternative 3

The procedure also uses Path Switch procedure as indicated in G1 of NPL 1. Note that it is initiated by the SeNB 30.

At steps S31-S32 shown in FIG. 5, the SeNB 30 sends Path Switch Request message to the MME 40 via the MeNB 20, includes 1) DC configuration information (contains the configured DRB information, SeNB ID and SeNB IP address), and 2) indicator to show this is for DC. This is to inform that there is a new bearer from a SeNB has been configured not that UE has changed cell in handover procedure.

Step S33: When the MME 40 receives Path Switch Request, it determines whether this message is for DC or handover. If it is for DC, it will not compute NH and not increase the NCC value it keeps. The MME 40 then sends Modify Bearer Request message to the S-GW 50, includes the DC configuration information (contains the configured DRB information, SeNB ID and SeNB IP address) it received above.

Step S34: The S-GW 50 sends Modify Bearer Response to the MME 40, if the verification is successfully completed.

Steps S35-S36: The MME 40 sends Path Switch Request Ack to the SeNB 30 via the MeNB 20. The MME 40 should include an indicator to inform the MeNB 20 this is for DC. The MME 40 should not include any NCC value in this message since this is not for handover.

Step S37: The S-GW 50 and the P-GW 60 exchange the Modify Bearer Request/Response messages.

Step S38: The P-GW 60 starts Downlink data.

The network entity (MME 40 or S-GW 50) should perform the verification as in Alternative 1.

Next, there will be described configuration examples of the MeNB 20 and the MME 40 with reference to FIGS. 6 and 7, respectively.

As shown in FIG. 6, the MeNB 20 includes a sending unit 21 and a receiving unit 22. The sending unit 21 sends, to the MME 40, the E-RAB Modification Indication message as shown at step S11 in FIG. 3, which includes the DC configuration information and/or the indicator. The receiving unit 22 receives, from the MME 40, the E-RAB Modification Confirmation message as shown at step S13 in FIG. 3. Note that these units 21 and 22 as well as other element(s) of the MeNB 20 can be implemented by at least hardware such as a transceiver which conducts communication with the SeNB 30, the MME 40 and the S-GW 50, a transceiver which conducts wireless communication with the UE 10, as well as a controller like a CPU (Central Processing Unit) which control these transceivers to execute the processes shown in each of FIGS. 2 to 5 or processes equivalent thereto. The MeNB 20 can also be implemented by the combination of such hardware, and software (e.g., a program as stored in a memory and executed by the CPU).

As shown in FIG. 7, the MME 40 includes at least a receiving unit 41 and a sending unit 42. The receiving unit 41 receives, from the MeNB 20, the E-RAB Modification Indication message including the DC configuration information and/or the indicator. The sending unit 42 sends, to the S-GW 50, the Modify Bearer Request message as shown at step S22 in FIG. 4, which includes the DC configuration information and/or the indicator. The sending unit 42 may be further configured to send the E-RAB Modification Confirmation message to the MeNB 20. The MME 40 may further include a verifying unit 43. The verifying unit 43 is triggered by the E-RAB Modification Indication message to verify the MeNB 20 and the SeNB 30 for the dual connectivity, as mentioned above. Alternatively, the Modify Bearer Request message may trigger the S-GW 50 to perform such verification. Note that these units 41 to 43 as well as other element(s) of the MME 40 can be implemented by at least hardware such as a transceiver which conducts communication with the MeNB 20 and the S-GW 50, as well as a controller like a CPU which control this transceiver to execute the processes shown in each of FIGS. 2 to 5 or processes equivalent thereto. The MME 40 can also be implemented by the combination of such hardware, and software (e.g., a program as stored in a memory and executed by the CPU).

Note that the present invention is not limited to the above-mentioned exemplary embodiment, and it is obvious that various modifications can be made by those of ordinary skill in the art based on the recitation of the claims.

The whole or part of the exemplary embodiment disclosed above can be described as, but not limited to, the following supplementary notes.

Supplementary Note 1

An MeNB that sends out a key S-KeNB after reception of "SeNB Addition/Modification Command", thereby to:
1) prevent the S-KeNB being maliciously used by an SeNB that received but the bearer will not be configured for a given UE; and/or
2) prevent increase of counter value.

Supplementary Note 2

An MeNB that sends S-KeNB identity to both of an SeNB and a UE.

Supplementary Note 3

A system that re-uses a Path Switch Request message to inform an EPC (MME and/or S-GW) about the SeNB/new bearer configuration.

Supplementary Note 4

An S-GW that verifies whether an MeNB and an SeNB are authorized to carry the dual connectivity.

Supplementary Note 5

A system, wherein Path Switch procedure is updated for DC that it contains:
1) DC configuration information (contains the configured DRB information, SeNB ID and SeNB IP address); and
2) indicator to show this is for DC.

Supplementary Note 6

A system, wherein an MME and an S-GW behavior in this procedure are updated for dual connectivity that:
1) the MME will not compute NH and not increase the NCC value it keeps;
2) the MME should include an indicator to inform an MeNB the Path Switch Request Ack message is for DC;
3) the MME should not include any NCC value in Path Switch Request Ack message since this is not for handover; and/or
4) the S-GW will not release the bearer in the MeNB as in handover procedure.

This application is based upon and claims the benefit of priority from Japanese patent application No. 2014-043929 filed on Mar. 6, 2014, the disclosures of which is incorporated herein in its entirety by reference.

REFERENCE SIGNS LIST

UE
MeNB
21, 42 SENDING UNIT
22, 41 RECEIVING UNIT
VERIFYING UNIT
SeNB
MME
S-GW
P-GW

What is claimed is:

1. A Master Node (MN) in a mobile communication system for a dual connectivity (DC), the mobile communication system configured to include a User Equipment (UE), the MN, a Secondary Node (SN), and a mobility management node, and the UE being connected to the MN and the SN, the MN comprising:
   at least one processor; and
   at least one memory coupled to the at least one processor, the at least one memory storing instructions that when executed by the at least one processor cause the at least one processor to:
   in an addition or modification procedure of the SN,
   perform a key update procedure for the SN when the MN receives a first message from the SN,
   derive a new key of the SN,
   send, to the SN, a second message including the new key of the SN and a first identifier of a set of information related to a security,
   send, to the UE, a RRCConnectionReconfiguration message including a second identifier of the set of information to indicate the new key of the SN in a manner such that the UE derives the new key of the SN based on the second identifier of the set of information, and
   send, to the mobility management node, a third message including cell related information.

2. The MN according to claim 1, wherein the cell related information indicates the DC.

3. A method of a Master Node (MN) in a mobile communication system for a dual connectivity (DC), the mobile communication system configured to include a User Equipment (UE), the MN, a Secondary Node (SN), and a mobility management node, and the UE being connected to the MN and the SN, the method comprising:
   in a case of an addition or modification procedure of the SN,
   performing a key update procedure for the SN when the MN receives a first message from the SN;
   deriving a new key of the SN;
   sending, to the SN, a second message including the new key of the SN and a first identifier of a set of information related to a security,
   sending, to the UE, a RRCConnectionReconfiguration message including a second identifier of the set of information to indicate the new key of the SN in a manner such that the UE derives the new key of the SN based on the second identifier of the set of information, and
   sending, to the mobility management node, a third message including cell related information.

4. The method according to claim 3, wherein the cell related information indicates the DC.

* * * * *